Figure 1:
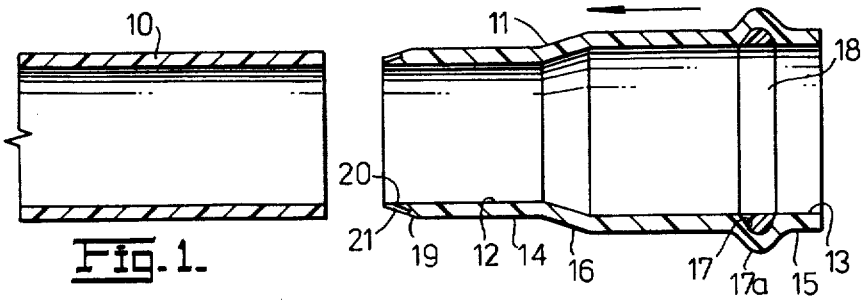

United States Patent
Parmann

[11] 3,887,992
[45] June 10, 1975

[54] PROCESS OF PRODUCING A SOCKET JOINT BETWEEN A PAIR OF LENGTHS OF THERMO-PLASTIC PIPE

[75] Inventor: Gunnar Parmann, Mathopen, Norway

[73] Assignee: Rieber & Son Plastic-Industri A/S, Bergen, Norway

[22] Filed: Mar. 4, 1974

[21] Appl. No.: 447,480

Related U.S. Application Data
[63] Continuation of Ser. No. 236,857, March 22, 1972.

[30] Foreign Application Priority Data
Apr. 1, 1971 Norway................................ 1223/71

[52] U.S. Cl.................... 29/450; 264/249; 285/423
[51] Int. Cl............................................. B23p 11/02
[58] Field of Search.................. 29/451, 450, 523 X; 285/423 X, 260, 374; 264/249 X

[56] References Cited
UNITED STATES PATENTS
3,265,410  8/1966  Lorang................................ 285/423
3,520,047  7/1970  Muhlner et al. .................. 29/450 X

FOREIGN PATENTS OR APPLICATIONS
1,172,418  6/1964  Germany........................ 264/249

*Primary Examiner*—Charlie T. Moon
*Attorney, Agent, or Firm*—Watson Leavenworth Kelton & Taggart

[57] ABSTRACT

A process for producing a socket joint to include a radially expanded shape- and dimensionally stable, internally calibrated reinforced socket end on a closed profile such as an end section of a length of thermoplastic pipe. Internal mould means are pushed into the profile end while the latter is in a heated condition and during the pushing-in operation a radially expanded end socket portion is directly formed making a tightly seated permanent connection with the mould means which is left inside the profile end after forming the latter to provide a nondisplaceable shape-retaining inner reinforcement for use in socket joint by snugly telescoping thereinto an unexpanded end of a second length of the pipe whereby the parts of such joint can be readily assembled and disassembled or adhered together.

3 Claims, 5 Drawing Figures

PROCESS OF PRODUCING A SOCKET JOINT BETWEEN A PAIR OF LENGTHS OF THERMO-PLASTIC PIPE

This is a continuation, of application Ser. No. 236,857, filed Mar. 22, 1972.

This invention relates to a process for producing a socket joint to include a radially expanded, shape- and dimension-stable, internally calibrated, reinforced socket end on closed profiles, such as a socket end on a length of pipe of thermoplastic material, and also the unexpanded end of another length of such pipe which is snugly telescoped into the socket end of the first pipe length.

According to the invention the special aim is a rational, simple and easy production of a radially expanded, reinforced end on elongated pipe lengths of thermoplastic material, so that the pipe end can obtain in a ready manner an arbitrary desired shape with Pat. application tolerances, strength and dimensional stability. The aim is to shape the end of the pipe so that it is suitable as a female end in a tight, but readily detachable socket joint connection between two elongated pipe lengths. Even if the mode of production is especially applicable for pipe production, it can also be considered employable for the production of other products, for example for the production of containers and the like. In the following description, however, particular reference shall be made to pipe production.

The production of pipes with such female ends for use in socket joints is carried out to-day in several ways. The most usual method is that the end of elongated pipe lengths is heated up and directly deformed to form a radial expansion having an internal annular groove for the reception of a sealing ring which is to form a seal between the end socket-carrying pipe end and the pipe end which is to be received in the end socket. Since such a radial, local expansion of the pipe wall leads to the pipe wall also becoming corresondingly thinner, there results a weakening of the end of the pipe. In order to compensate for such a weakening of the pipe wall it is usual to reinforce the pipe end which is to be expanded. This can be done by thickening the pipe wall locally at the positions of the pipe which are later to be expanded or stretched out radially, by effecting a local clenching of the pipes during the production of the latter in long lengths, as is described in Norwegian Patent Application No. 143,002.

Another usual method is that before expanding the pipe end a short pipe length is threaded outside the pipe portion which is to be expanded, so that this portion during the subsequent shaping correspondingly and simultaneously conforms to the contours of the pipe end and becomes an effective external reinforcement of the pipe end.

Such conventional expanding methods have unfortunate circumstances in common in that the whole of the pipe length must be moved in order that the necessary working operations on the limited portion of the pipe end can be effected in special apparatus.

With the present invention the aim is first and foremost an especially simple and cheap production of pipe socket ends and like products.

The process according to the invention for producing a radially expanded shape- and dimensionally stable, internally calibrated, reinforced socket end on a closed profile comprises leaving in the profile end an internal mould means having the desired dimensional tolerances after forming the profile end to provide a non-displaceable shape-retaining inner reinforcement in the finally formed profile end sitting tightly to the profile end for use in socket joints which can be readily assembled and disassembled or adhered together, the improvement which comprises pushing into the profile end the mould means while the former is in a heated condition and directly forming during the pushing-in operation a radially expanded end socket portion making a tight-sitting permanent connection with said mould means.

According to the invention the shaping of the socket is thus effected in two stages, namely in that the calibrated, precisely shaped part of the socket which is to receive the sealing element and form the inside of the socket which faces the pipe which is to be received in the socket, is produced in a first stage, as a separate part, and thereafter in a second stage said separate socket part is worked into the associated pipe length.

From a productional view it is considerably simpler, quicker and cheaper to produce the shape-demanding and accurate part of the socket as a suitable separate part independent of the pipe length which the socket shall later be joined to, rather than having to form it directly on an elongated pipe length. From the productional view one is no longer bound either to this shape-accurate part of the socket being of the same material as the pipe itself and since the separately produced part has a limited length in relation to long pipe lengths it can be produced in an arbitrary manner, for example by injection moulding, alternatively spray casting, rolling, expansion, etc.

As a consequence of the possible freedom of choice with respect to the selection of material and method of production the strongest demands which can occur as to strength, dimensional and shape tolerances, dimensional stability, etc. can be fulfilled.

On jointing of pipes it is important that the pipe portions' and other joint portions' inner surfaces are as far as possible flush with one another so that there is obtained a uniform and continuous guide surface internally of the pipe conduit.

Furthermore a big demand is placed on the strength and impermeability of the pipe socket, for example in pressure water conduits. By socketing according to the invention by means of a prefabricated socket member there is obtained an automatic reinforcing of the pipe end which is expanded, the pipe wall being actively supported by the socket member in the whole of the radially expanded region. If the socket member is also to be reinforcing with respect to internal medium pressure, the socket member must be provided with a spherical sealing element at right angles to the axis of the pipe, and the sealing element placed in the socket member end which is initially led into the heated pipe end during the socketing operation, so that no pressure is built up in the capillary gap which is formed between the socket member and pipe.

It shall be further mentioned that it does not take much to obtain an effective sealing between the socket member and pipe, since the heated pipe as a consequence of its elastic properties during the shaping operation of itself conforms to the contours of the socket member and bears against the sealing element, so that the demands for dimensional tolerances in the sealing per se fall away.

The conventional expansion methods discussed, in which there are utilised thickened pipe end portions so as to compensate for the reduction of wall thickness in the forming of the radially expanded end socket portion, will be burdened by the considerable technical production disadvantage that it is just this portion of the pipe which is to be heated up, and as a consequence of the especially poor heat-conducting ability of the thermoplastic material this involves an undesired extension of the heating period. A corresponding disadvantage is avoided according to the invention, since by employing the internally arranged reinforcing member one does not need to utilise thickened pipe material in the pipe end and thereby one does not need to prolong the heating time either.

A further similarly unfortunate circumstance in the discussed conventional ways of effecting the radial expansion of the pipe ends, is that the thickened, formed but still yet warm pipe end shall be cooled down again, and that the shaped pipe end during the cooling down period must be supported by the shape-giving element, since the pipe end first becomes stable as regards shape after cooling down. Corresponding provisions are not necessary according to the present invention, since the shape-giving element is left as a shape-retaining inner reinforcement in the profile end thus formed.

As a consequence of the shape-giving element in the discussed, hitherto conventionally used socketing methods not being left in the pipe end after shaping but on the contrary being used again in new pipe ends, the degree of utilisation of the apparatus is relatively small. It is usual that the socket operation itself, that is to say the forming of the pipe socket in the end of the pipe, constitutes a bottle-neck in pipe production.

The long heating and cooling period in the discussed conventional and known socketing methods has led to the fact that only by using especially complicated machinery one can construct the desired shaping of the pipe ends directly in the continuously operating course of production for the manufacture of pipe. As a consequence of the capital-demanding arrangements which must be made for an automatic shaping of the pipe ends in a continuous pipe production operation, the socketing is to-day in the bulk of the factories to a large extent carried out by hand, and since there is usually being used one man per socket apparatus a long heating period and particularly a long cooling period will be especially awkward and expensive.

It is evident that according to the invention there is achieved a considerable simplification of the pipe manufacture by effecting the radial expansion of the pipe end by means of a socket member which is pushed into a hot pipe end and by thereafter allowing the separately manufactured, internally arranged socket member to be left inside the pipe as a shape-stabilising, reinforcing element. On possible subsequent heating of a pipe end for the production of the socket end according to the invention the heating time is relatively short, since the pipe end which is to be heated is not thicker than the remaining pipe and the cooling time has no practical significance any longer, since the pipe can be placed directly in storage after introducing the shape-stable socket member.

As a consequence of the poor heat-conducting properties of the thermoplastic material it has been found that even a socket member of the same thermoplastic material as the pipe itself and having the same thickness as the pipe, can be utilised as the socket member without having thereby to be force-cooled after shaping so as to ensure permanence of shape.

The process according to the invention now opens possibilities to effect in a simple and cheap manner a fully automatic process of socketing pipe ends directly in the pipe production-line in step with the speed of production of the latter, and can thus utilise the heat content which in this stage of the manufacture is present in the pipe.

As the pushing in of the shape-stable and shapegiving socket member in a hot pipe end can be carried out readily by hand even where large pipes are concerned, the mode of manufacture according to the invention opens possibilities for effecting the socketing of the pipe ends without complicated equipment directly at any location, for example by users directly at the place of working, in so far as one has available a suitable heat source to heat up the pipe ends with, for example by heating by means of hot oil or the like or by means of a propane flame. This now also gives users the possibility of utilising in a simple and cheap manner even pipe lengths which for fitting purposes one has had to divide and for example has cut the socket end off.

The invention provides in a process for producing such a socket joint the production of a separately formed, shape- and dimensionally stable socket member having the desired dimensional tolerances, designed with a socket portion having a cylindrical inner surface in which there is formed a groove for the reception of a sealing ring and having a cylindrical outer surface with an annular bead extending radially outwardly therefrom, the socket member constituting mould means comprising a cylindrical threading-on portion stepped from the socket portion via an inclined web portion and having a cylindrical inner surface for positioning substantially in alignment with the inner surface of a non-expanded profile end, said threading-on portion having a conically pointed change surface from the inner surface towards a corresponding cylindrical outer surface.

In order to ensure an anchoring against axial displacement in addition to the anchoring which is obtained by the friction forces which will occur between the shaped pipe end and the socket member as a consequence of the tangential tensions in the elastic pipe wall of the pipe end, the socket member can be designed with one or more lateral beads or rib formations. Such beads or rib formations which are formed on the outside of the socket member can form on the inside of the socket member an expanded spherical groove in a plane at right angles to the longitudinal axis of the pipe designed for the reception in a manner known per se of an internal sealing means.

If a particularly large requirement is not placed with regard to the sealing between the expanded pipe end and the associated socket end it is unnecessary to provide the socket member with any sealing element against the associated expanded pipe end if the socket member is provided with a local, radially expanded bead at right angles to the axis of the pipe, since an internal pressure medium will lead to an attempt to force the socket member out of the pipe end so that the abutment between local beads of the socket member and the correspondingly shaped groove in the pipe end which is formed over the socket member leads to the socket member being self-sealing.

In order to ensure sealing between the expanded pipe end and the associated socket member, the socket member can at its front end during pushing in be provided with a conically pointed end surface and in or at this surface can be provided with a radially spherical groove for the reception of a separate sealing member.

Figure 2:
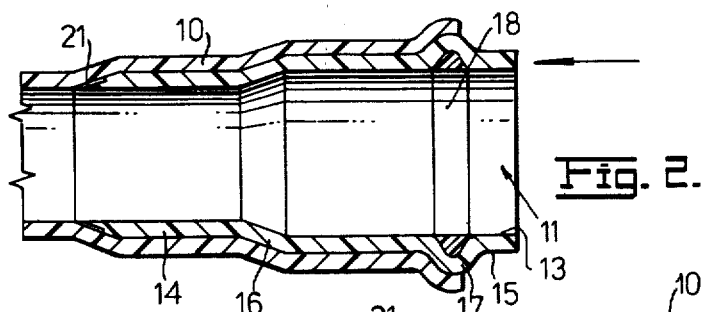
Figure 3:
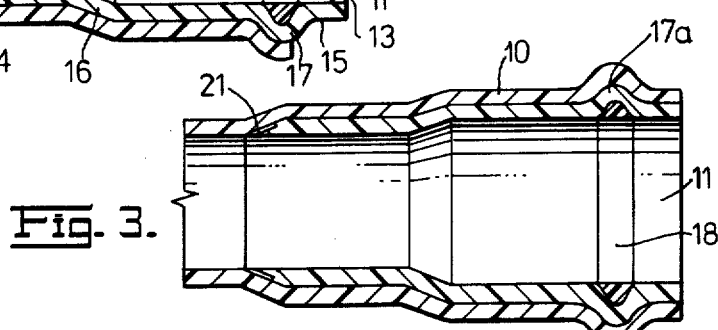
Figure 4:
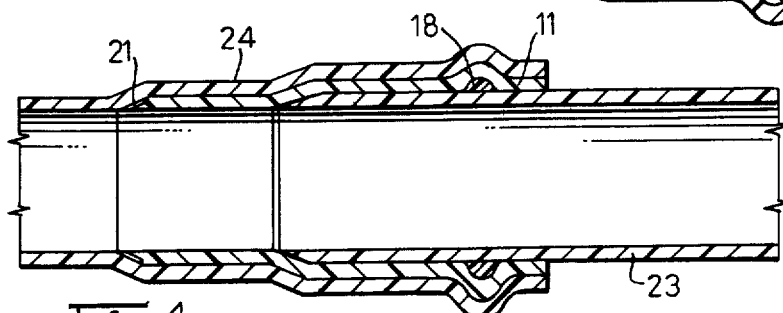
Figure 5:
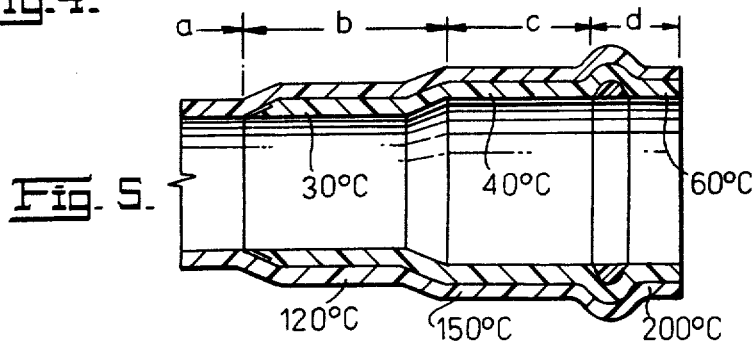

In order that the invention can be more readily understood, a convenient embodiment thereof will now be described, by way of example, with reference to the accompanying drawings in which:

FIG. 1 shows, in section, a socket member immediately before this is pushed in to a hot pipe end, FIG. 2 shows, in section, the socket member half pushed in the hot pipe end partially shaped by means of the socket member, FIG. 3 shows, in section, the socket member fully pushed in the hot pipe end shaped by means of the socket member, FIG. 4 shows, in section, a pipe joint in which there is utilised a pipe end as illustrated in FIG. 3, and FIG. 5 shows, in section, the temperature distribution along the hot pipe and socket member.

In FIG. 1 there is shown the one end 10 of a pipe manufactured from thermoplastic. In the illustrated embodiment rigid polyvinyl chloride is considered as the thermoplastic material, but one can use an arbitrarily suitable thermoplastic material as for example polyethylene. The illustrated pipe end 10 has the same thickness and cross-section as the remainder of the pipe and is in a hot condition. A portion of the heat content can stem from a preceding pipe-manufacturing stage or in its entirety from reheating after a preceding cooling down and if desired after a longer storage time.

At 11 there is shown a separately manufactured permanently shaped dimensionally stable and precisely shaped socket member which is to be used as a combined mould body and permanent reinforcing body having the necessary dimensional and shape tolerances.

The socket member in the illustrated embodiment is made of thermoplastic material by shaping short pipe lengths of rigid polyvinyl chloride. Alternatively the socket member 11 can be made in other ways and from other materials, for example in the form of injection moulded socket members of acrylonitrile-butadiene-styrene copolymer or of reinforced thermosetting plastic, such as glassfiber filled polyester or in the form of rolled out or cast socket members of aluminium or other metallic material.

The socket member in the illustrated embodiment is made with a first cylindrical inner surface 12 at the one end and with another radially expanded, cylindrical inner surface 13 at the other end and with correspondingly stepped cylindrical outer surfaces 14 and 15 right outside the inner surfaces 12 and 13. Between the inner surfaces 12 and 13 and correspondingly between the outer surfaces 14 and 15 there is shown an inclined web portion 16. In the inner surface 13 there is cut out an annular groove 17, in which there is received a sealing ring 18.

Correspondingly there is formed on the outer surface 15 a corresponding annular bead or rib 17a. The outer surface 14 is slanted off towards the outer end towards the inner surface 12 having a conical surface 19. In a cavity 20 in the surface 19 there is fixed a band-shaped sealing ring 21.

In FIG. 2 it is shown how the hot pipe end slides outside the permanently shaped socket member 11 by pushing in the socket member 11 into the pipe end 10, the pipe end creeping upwards along the sealing ring 21, the surface 19 and the surface 15 and along the bead or rib 17a.

In FIG. 3 the socket member 11 is shown after the latter is led into position in the pipe end and there is formed internal sealing between the inner surface of the pipe 10 and the sealing ring 21. It is shown that the pipe end terminates sitting tightly on the socket member along the whole of the longitudinal extent of the socket member and by placing the pipe for cooling the pipe end is fixed in position in non-displaceable engagement with the socket member.

The bead or rib 17a serves as an anchoring element which prevents axial displacement between the socket member and the pipe end, after the expanded shape of the pipe end is fixed by cooling. The cooling can occur by free convection to the air. Mutual turning between the socket member and the pipe end can for example be prevented by designing local radial projections or depressions on the outside of the socket member.

In FIG. 4 there is shown a pipe joint which is designed so as not to be able to transfer tension forces between the adjoining pipes and which is designed so as to be able to be assembled and disassembled in a simple manner. There is shown an unworked pipe end 23 which is shoved into place in a worked pipe end 24 according to FIG. 3.

The sealing ring 18 forms a seal between the pipe end 23 and 24 in a known manner.

Referring to FIG. 5, wherein a pipe of rigid polyvinyl chloride is used, the heating-up according to the invention is carried out with local heating steps, that is to say without heating at $a$, with heating to approximately 120°C at $b$ and with heating to approximately 150°C at $c$ and with heating to approximately 200°C at $d$.

A mould means of the same thermoplastic material as the pipe, and with the same wall thickness can be utilised without the danger of temperature deformation of the mould means by cooling down the socketed end by free convection to the air, since only a moderate heating of the mould means takes place due to the low heat transfer in thermoplastic material and thereby a precise dimensional tolerance for the mould means can be ensured. There is indicated in FIG. 5 that the maximum temperatures at the inner surface of the mould means per se in the zones $b$, $c$ and $d$ reach to approximately 30°, 40° and 60°C respectively as measured in practical tests by heat transfer from the hot pipe end. The heating effected as shown in this figure will not effect the dimensional tolerace of the mould means.

By virtue of the powerful expansion the heated pipe end is subjected to on pushing in the prefabricated mould means there will occur, with pipes having a relatively small thickness and composed of a relatively soft material having small shape stability, such large axial forces that the heated pipe end will, without special heating and designing of the mould means, stretch and curl so that it will not withstand the pushing-on force and consequently will not pass over the mould means.

The criterion for being able to carry out the process is that the diameter of the mould means at the pushing-on end is sufficiently small and that this is increased stepwise and that the temperature and the lengths of the steps in the individual zones $b$, $o$ and $d$ on the pipe end are adapted to each other. The pipe end is warmest outermost in zone $d$ and the temperature falls off for each step backwards to zone $a$ which is at room temperature.

The lengths of the steps on the internal moulding means are adapted such that the heated pipe end can take up the axial pushing force in the individual sections without curling. Since zone $d$ of the pipe end must be heated so much as to climb the largest diameter, the danger of curling is so great here that the pipe end must be supported by the cylindrical portion of the internal mould means at zone $c$, and the length of this must be adapted to the length of zone $d$. The same reasoning is also applicable to zone $c$.

I claim:

1. A process for producing a socket joint between a pair of lengths of thermoplastic pipe, comprising providing an internally calibrated pipe end receptive socket in one end of one of said pipe lengths by telescopically pushing axially into the core of said pipe end while the latter is in a heated elastically-deformable condition a one-piece and annularly continuous sleeve mould having a through bore with an annular gasket ring-carrying groove therein and an outwardly tapered leading end insertable in said pipe bore and being of greater outer transverse dimensions than the diameter of said pipe bore receptively to expand and shape this pipe end progressively in conformity to the exterior contour of said sleeve mould, leaving said sleeve mould telescoped within said expanded pipe end to serve as a non-displaceable and permanent internal reinforcing member therefor with the bore of said sleeve mould having at least an annular section into which one end of the other of said pipe lengths can be snugly fitted, providing a gasket ring in said ring-carrying groove, and telescoping said end of the other of said pipe lengths into said annular section of said sleeve mould bore with a snug fit thereby providing said socket joint.

2. The process according to claim 1, which comprises subjecting the heated end of said first pipe to step-wise radial expansion progressively by the exterior contour of said sleeve mould, as the latter is advanced into said pipe end bore, with this step-wise expansion being effected by longitudinally spaced apart inclined sloping annular surface formations in said sleeve mould contour.

3. The process according to claim 1, further comprising forming by localized radial expansion of an annular groove within the bore of said heated pipe end by an annular spherical rib provided in the exterior contour of said sleeve mould with these rib and groove structures interfitting, said annular rib being located radially outward of said annular gasket ring-carrying groove in the annular bore section of said sleeve mould into which the end of the other pipe section is snugly fitted in forming said socket joint.

* * * * *